(12) United States Patent  
Rioux et al.

(10) Patent No.: US 7,980,799 B1  
(45) Date of Patent: Jul. 19, 2011

(54) AIR BAG INFLATOR

(76) Inventors: Paul A. Rioux, Mount Dora, FL (US);  
Marcia B. Rioux, Mount Dora, FL (US)

( * ) Notice: Subject to any disclaimer, the term of this patent is extended or adjusted under 35 U.S.C. 154(b) by 486 days.

(21) Appl. No.: 12/128,204

(22) Filed: May 28, 2008

(51) Int. Cl.  
*B61D 45/00* (2006.01)

(52) U.S. Cl. .......................................... 410/119; 141/10

(58) Field of Classification Search .................. 410/119, 410/124, 128, 154, 155; 280/728.1, 741, 280/736; 141/10, 114, 329; 137/68.3; 222/5; 441/93  
See application file for complete search history.

(56) References Cited

U.S. PATENT DOCUMENTS

| | | | |
|---|---|---|---|
| 1,766,182 A | 6/1930 | Markus | |
| 3,579,964 A | 5/1971 | Ohlstein | |
| 4,073,389 A * | 2/1978 | Angarola et al. | 410/119 |
| 4,498,881 A | 2/1985 | Buckle | |
| 5,806,572 A * | 9/1998 | Voller | 141/10 |
| 6,422,420 B1 | 7/2002 | Brown | |
| 6,589,087 B2 * | 7/2003 | Mackal et al. | 441/93 |
| D499,637 S | 12/2004 | Elze et al. | |
| 6,951,493 B1 * | 10/2005 | Lu | 441/93 |
| 7,008,155 B2 * | 3/2006 | Smith et al. | 410/119 |
| 7,128,629 B2 * | 10/2006 | Summers | 441/81 |

* cited by examiner

*Primary Examiner* — Glenn Dayoan  
*Assistant Examiner* — SunSurraye Westbrook (57) ABSTRACT

This patent discloses a freight dunnage bag to accommodate discrete units of freight that have been loaded on board a freight carrier for transportation. The freight dunnage bag may include a first layer dividing a freight dunnage bag interior from a freight dunnage bag exterior. An adaptor having a capsule attached between a cap and a valve body may be attached to the first layer so that the first layer may be positioned between the capsule and the cap. A gas cartridge containing compressed gas may be attached to valve body within the freight dunnage bag interior.

17 Claims, 6 Drawing Sheets

AIR BAG INFLATOR

BACKGROUND

1. Field

The information disclosed in this patent relates to automatic inflation of freight dunnage bags for freight accommodation.

2. Background Information

Freight includes goods, cargo, or lading transported for pay, whether by water, land, or air. Freight carriers such as ships, semi-trailer trucks, and airplanes are designed to receive discrete units of freight for transportation. However, even the best designs cannot assure the integrity of the load unit against the varied hazards of dynamic forces incident to transit. During transport, one of the biggest factors of cargo damage is the forward or backward collisions between the discrete units of freight. Freight dunnage bags are used to help in this area.

A freight dunnage bag may include an air-expanded bladder having an inlet port to receive compressed air from an external air compressor. As freestanding members unconnected to the freight carrier, freight dunnage bags may be inserted freely between and in contact with adjacent load units to accommodate the freight by filling in the spaces between the load units. When installed, freight dunnage bags may brace loads, absorb vibrations, and otherwise protect the cargo from falling forward or backward.

Inserting compressed air into a freight dunnage bag is a tool- and labor-intensive process. First, an air compressor having an air gauge is attached to an air gun tool. The air compressor then is attached to an electrical power source. The freight dunnage bag carefully is positioned between cargo so that its inlet port is exposed to be connected to the air gun tool. This task is not so straightforward since the discrete units of freight often come in various shapes and arranging a freight dunnage bag among such freight to expose the inlet port is difficult and sometimes not possible. The weighty, bulky air compression device then is moved in proximity to the freight dunnage bag. The air gun tool then is attached to the freight dunnage bag inlet port. The gun is squeezed and compressed air from the external air compressor passes through the inlet port to fill the freight dunnage bag. The gun then is removed from the inlet port and the process repeated for each freight dunnage bag within the cargo hold. At the end, the air compressor, air gauge, and air tool then may be removed from the freight carrier.

Freight carrier operators spend a considerable amount of time and effort to install and expand typical freight dunnage bags. This leads to delay in delivery and loss of business revenue. What is needed is to address these and other issues.

SUMMARY

This patent discloses a freight dunnage bag to accommodate discrete units of freight that have been loaded on board a freight carrier for transportation. The freight dunnage bag may include a first layer dividing a freight dunnage bag interior from a freight dunnage bag exterior. An adaptor having a capsule attached between a cap and a valve body may be attached to the first layer so that the first layer may be positioned between the capsule and the cap. A gas cartridge containing compressed gas may be attached to valve body within the freight dunnage bag interior.

DETAILED DESCRIPTION

Figure 1:
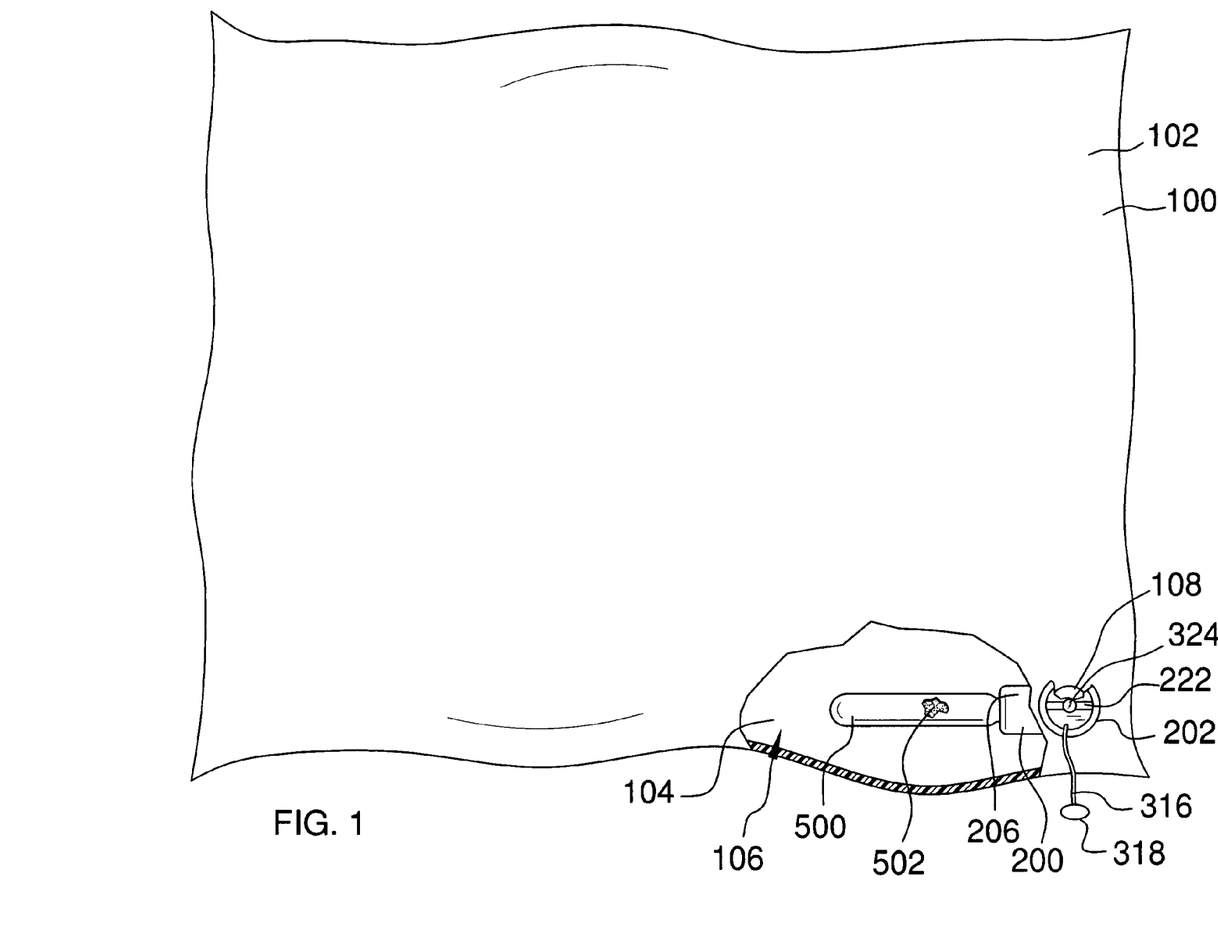
FIG. 1 is an elevated view of a freight dunnage bag 100.

FIG. 1 is an elevated view of a freight dunnage bag 100. Freight dunnage bag 100 may be a load-supporting container utilized to accommodate freight during transportation on trucks, ships, airplanes, and other freight carriers. Freight dunnage bag 100 may enclose a cushion of gas and be inserted freely between and in contact with adjacent load units. As a freestanding member unconnected to the freight carrier, freight dunnage bag 100 may accommodate the freight by filling in the spaces between the load units to brace the loads, absorb vibrations, and otherwise protect the cargo freight from falling forward, backward, sideward, and sometimes from moving upwards or downwards. In one example, freight dunnage bag 100 may be configured to endure more than ten tons of pressure.

Freight dunnage bag 100 may include a first layer 102. Freight dunnage bag 100 may include a second layer 104 directly or indirectly attached first layer 102 to enclose a freight dunnage bag interior 106. First layer 102 may be flexible, wraparound, flat, sheet-like expanses made of one or more layers. First layer 102 may include woven, nonwoven, plastic, non-plastic textiles, such as kraft paper, polypropylene nonwoven textiles, polyethylene membranes, burlap, and co-extrusion polyamide film. Second layer 104 may have features similar to first layer 102. Freight dunnage bag interior 106 may be a hollow area situated within freight dunnage bag 100. Although freight dunnage bag 100 generally may have a rectangular shape, freight dunnage bag 100 may have a variety of shapes, sizes, and/or configurations, including those that may fit around the smooth or angular contoured edges of a shipping container.

Figure 5:
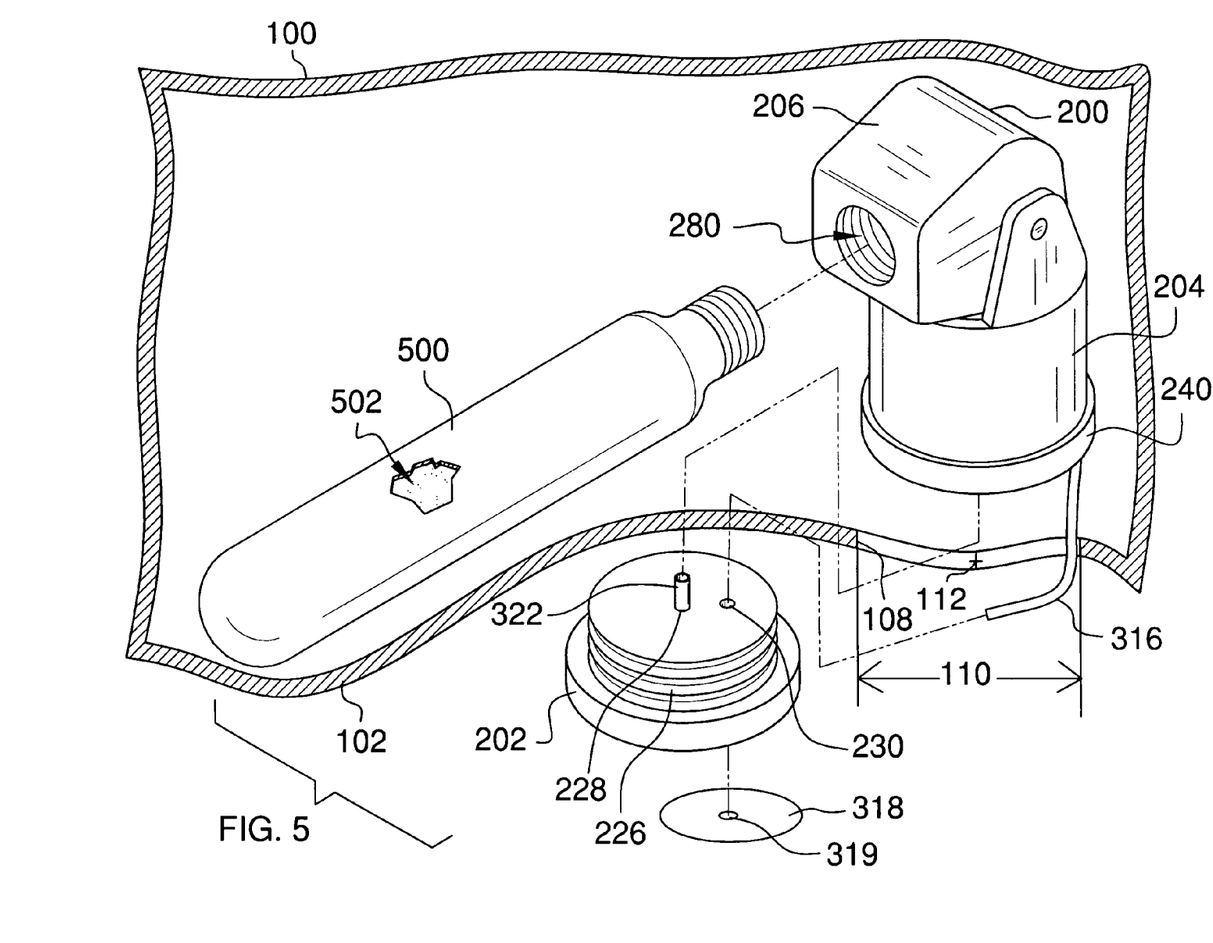
FIG. 5 is an exploded isometric view of freight dunnage bag 100.

First layer 102 may include a freight dunnage bag hole 108 having a freight dunnage bag hole diameter 110 (FIG. 5). Freight dunnage bag hole 108 may be an opening through first layer 102 having a freight dunnage bag hole center 112 (FIG. 5). Freight dunnage bag hole 108 may have a circular shape. Freight dunnage bag hole diameter 110 (FIG. 5) may be a length of a straight line passing through freight dunnage bag hole center 112 and connecting two points on a circumference of freight dunnage bag hole 108 when first layer 102 is flat.

Freight dunnage bag 100 additionally may include an adaptor 200 and a gas cartridge 500. Adaptor 200 (or adapter 200) may be connected between gas cartridge 500 and first layer 102 of freight dunnage bag 100. Gas cartridge 500 may be a tube holding compressed gas 502 and may be positioned within freight dunnage bag interior 106 after assembly of freight dunnage bag 100. Compressed gas 502 may include an inert gas, carbon dioxide, air, and/or dinitrogen monoxide. Adaptor 200 may be releasably attached to freight dunnage bag hole 108 to seal freight dunnage bag interior 106. Adaptor 200 may allow a user to operate gas cartridge 500 from outside freight dunnage bag 100 to release compressed gas 502 from gas cartridge 500 into freight dunnage bag interior 106.

Figure 2:
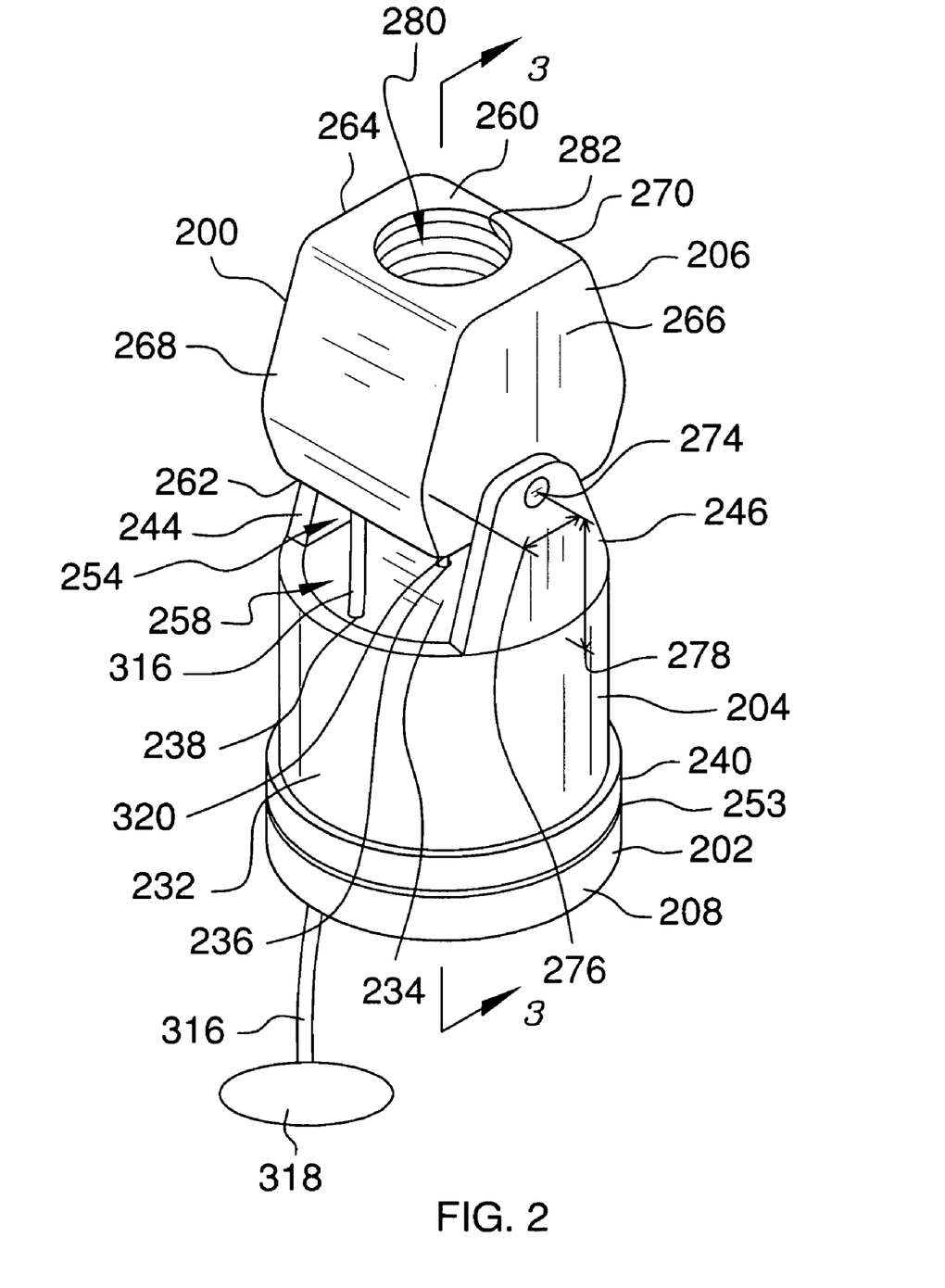
FIG. 2 is an isometric view of adaptor 200.
Figure 3:
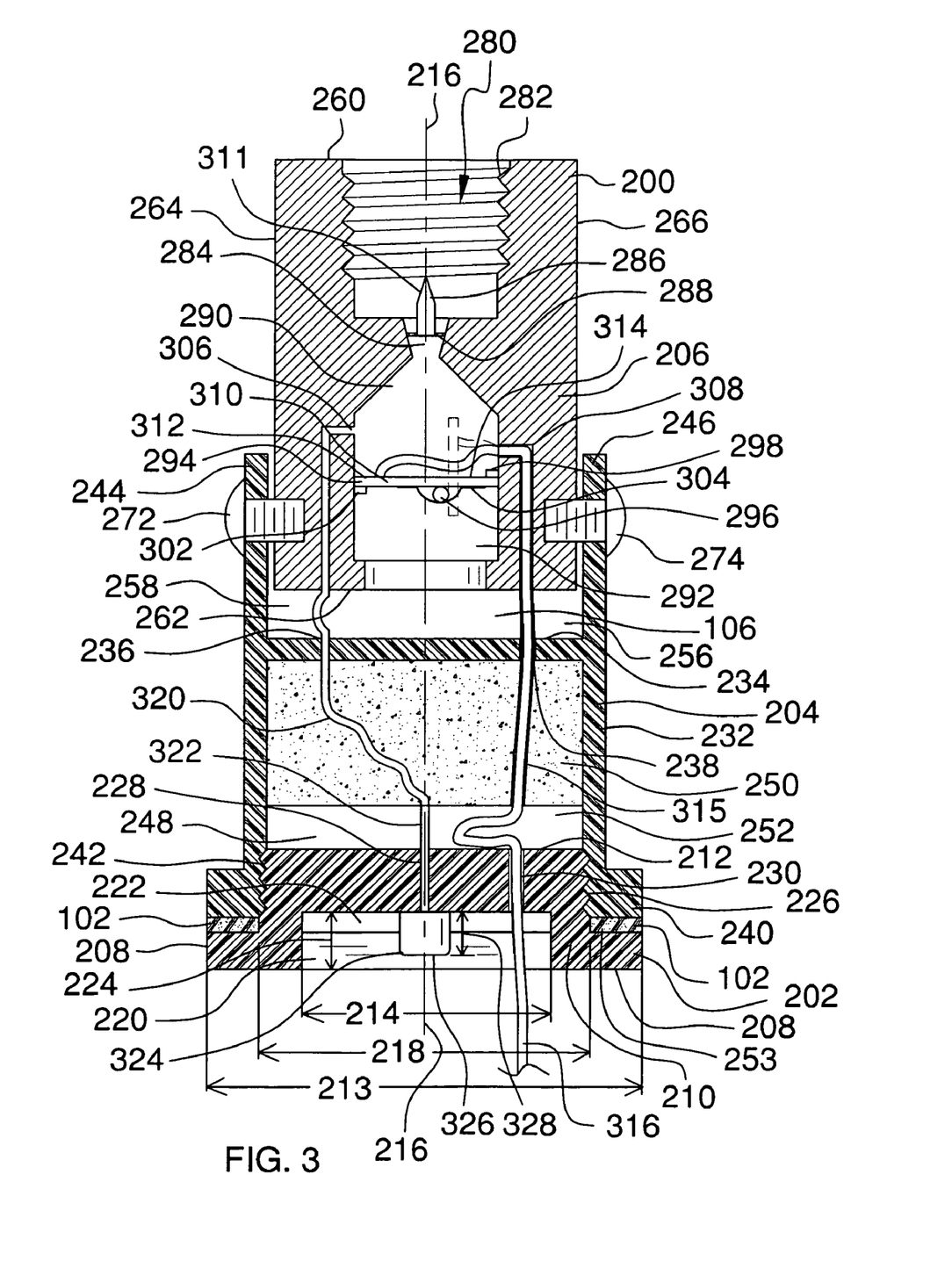
FIG. 3 is a section view of adaptor 200 generally taken off line 3-3 of FIG. 2.

FIG. 2 is an isometric view of adaptor 200. FIG. 3 is a section view of adaptor 200 generally taken off line 3-3 of FIG. 2. Adaptor 200 may be a device to seal the opening through first layer 102—seal freight dunnage bag hole 108—and to provide a user a way to control the gas pressure within freight dunnage bag 100. Adaptor 200 may include a cap 202, a capsule 204, and a valve body 206. Capsule 204 may be attached between cap 202 and valve body 206.

Cap 202 may be a lid configured to mate with capsule 204 so that bag first layer 102 may be sandwiched between cap 202 and capsule 204. Cap 202 may include a cap lip 208, a cap sidewall 210, and a cap bottom 212. Cap sidewall 210 may be connected between cap lip 208 and cap bottom 212.

Cap lip 208 may be that portion of cap 202 configured to reside outside of freight dunnage bag interior 106. Cap lip 208 may include a cap lip outside perimeter 213 concentric with a cap lip inside perimeter 214 about an adaptor centerline 216.

Cap sidewall 210 may be an annulus ring connected between cap lip 208 and cap bottom 212. Cap sidewall 210 may have a cap sidewall outside perimeter 218 and share cap lip inside perimeter 214 with cap lip 208. Cap lip outside perimeter 213 may be greater in diameter than cap sidewall outside perimeter 218. Cap lip inside perimeter 214 and cap bottom 212 may contain a bulb well 220. Bulb well 220 may be a hollow area having a cap rib 222 to assist in rotating cap 202 and having a bulb well height 224.

Cap bottom 212 may be a lower portion of cap 202. Cap bottom 212 may have cap bottom external threads 226, a cap tube hole 228, and a cap cord hole 230. Cap bottom external threads 226 may be a raised helical rib going around an exterior cap bottom 212. Cap tube hole 228 may be an opening through cap bottom 212 having a center aligned with adaptor centerline 216. Cap cord hole 230 may be an opening through cap bottom 212 having a center offset from adaptor centerline 216.

Capsule 206 may be that portion of adaptor 200 that may be configured to remain relatively stationary during installation. Capsule 206 may include a capsule sidewall 232, a capsule base 234, a capsule tube hole 236, a capsule cord hole 238, and a capsule lip 240 having a capsule lip interior threads 242. Capsule 206 further may include a capsule left stanchion 244, and a capsule right stanchion 246. Capsule base 234 may be positioned within capsule sidewall 232, and capsule tube hole 236 and capsule cord hole 238 may pass through capsule base 234. Capsule lip 240 may be attached to a first end of capsule sidewall 232 and attached to an opposite end of capsule sidewall 232 may be capsule left stanchion 244 and capsule right stanchion 246.

Capsule sidewall 232 may be an annulus cylinder centered about adaptor centerline 216 and connected between capsule lip 240 and capsule left stanchion 244 and capsule right stanchion 246. Capsule base 234 may be a disc positioned perpendicular to adaptor centerline 216 within capsule sidewall 232. Capsule tube hole 236 may be an opening through capsule base 234 having a center offset from adaptor centerline 216. Capsule cord hole 238 may be an opening through capsule base 234 having a center offset from adaptor centerline 216. Together, capsule sidewall 232 and capsule base 234 may enclose a capsule interior 248 accessible through capsule tube hole 236 and capsule cord hole 238.

Adaptor 200 further may include sealant 250. Sealant 250 may be a material to seal openings within capsule base 234 against the passage of compressed gas 502 within freight dunnage bag interior 106. Sealant 250 may be positioned adjacent to capsule base 234 and fill capsule interior 248 to define a capsule interior gap 252. Capsule interior gap 252 may be a hollow space within capsule interior 248 positioned between sealant 250 and cap bottom 212.

Capsule lip 240 may be that portion of capsule 204 configured to reside inside of freight dunnage bag interior 106. Capsule lip 240 may include a capsule lip outside perimeter concentric with a capsule lip inside perimeter about adaptor centerline 216. The capsule lip outside perimeter substantially may equal a diameter of cap lip outside perimeter 213. Capsule lip interior threads 242 may include a helical rib configured to mate with cap bottom external threads 226. When cap 202 and capsule 204 are assembled together, cap lip 208 and capsule lip 240 may form a bag gap 253 between cap lip 208 and capsule lip 240. In assembly, first layer 102 of freight dunnage bag 100 may be secured between cap lip 208 and capsule lip 240 within bag gap 253.

Capsule left stanchion 244 and capsule right stanchion 246 each may be upright supports extending from capsule sidewall 232 away from capsule lip 240 to face each other. Capsule left stanchion 244 and capsule right stanchion 246 maybe separated by a rear stanchion opening 254 (FIG. 2) and a front stanchion opening 256. Together, capsule left stanchion 244, capsule right stanchion 246, and capsule base 234 may define a valve body well 258. Rear stanchion opening 254, front stanchion opening 256, and valve body well 258 each may be hollow spaces.

Valve body 206 may be a head of adaptor 200 that may receive gas cartridge 500 and may rotate relative to capsule 204. Valve body 206 may include a valve body top 260 and a valve body bottom 262 positioned between a valve body left side 264, a valve body right side 266, a valve body rear 268 (FIG. 2), and a valve body front 270 (FIG. 2).

Valve body 206 and capsule 204 may be connected so that part of valve body 206 may reside within valve body well 258. Adaptor 200 may include a left hinge axle 272 connected between capsule left stanchion 244 and valve body left side 264. Additionally, adaptor 200 may include a right hinge axle 274 connected between capsule right stanchion 246 and valve body right side 266. Left hinge axle 272 and right hinge axle 274 may permit valve body 206 to rotate relative to capsule 204.

Left hinge axle 272 and right hinge axle 274 may be positioned at a valve body radius 276 (FIG. 2) from valve body rear 268 and valve body front 270. Left hinge axle 272 and right hinge axle 274 may be positioned at an axle height 278 (FIG. 2) from capsule base 234. In one example, axle height 278 may be greater than valve body radius 276 to permit valve body 206 to rotate more than ninety degrees relative to capsule 204. When rotating, valve body 206 may pass through at least one of rear stanchion opening 254 and front stanchion opening 256.

Valve body 206 additionally may include a cartridge docking station 280 having valve body internal threads 282. Valve body 206 further may include an inlet port 284, a pin 286, a pin mount 288, an expansion port 290, an outlet port 292, a disc 294, a stem 296, an upper seat 298, a lower seat 302, a spring 304, a status tube channel 306, and an actuating cord channel 308. Disc 294, stem 296, upper seat 298, lower seat 302, and spring 304 may be part of a discharge valve 310.

Cartridge docking station 280, inlet port 284, expansion port 290, and outlet port 292 may be centered on adaptor centerline 216 and be connected to form an open passageway from valve body top 260 through valve body 206 to valve body bottom 262. Pin mount 288 may connect pin 286 to inlet port 284. Stem 296 may connect disc 294 to outlet port 292 and spring 304 may be connected about stem 296 and against disc 294. Upper seat 298 may be connected to expansion port 290 and lower seat 302 may be connected to outlet port 292. Spring 304 may bias disc 294 against and between upper seat 298 and lower seat 302. Status tube channel 306 and actuating cord channel 308 may pass from valve body bottom 262 through valve body 206 to expansion port 290.

Cartridge docking station 280 may be a hole through a portion of valve body 206 to receive gas cartridge 500. Cartridge docking station 280 may be open at valve body top 260 and a center of cartridge docking station 280 may be on adaptor centerline 216. Valve body internal threads 282 may mate with threads of gas cartridge 500.

Inlet port 284 may be an opening in valve body 206 between cartridge docking station 280 and expansion port 290. Inlet port 284 may be a converging section having a diameter that may narrow from cartridge docking station 280 to expansion port 290. Gas cartridge 500 may contain dust and other particles that may clog inlet port 284 over time. The convergence of inlet port 284 may speed the flow of compressed gas 502 through inlet port 284 to keep inlet port 284 clean.

Pin 286 may be a small peg having a sharp pin end 311 capable of piercing a sealed end of gas cartridge 500. Pin mount 288 may be an attachment to support pin 286 against inlet port 284 and orientate pin 286 vertically along adaptor centerline 216. Pin mount 288 may be configured to allow compressed gas 502 to pass from one side to the other.

Expansion port 290 may be an opening in valve body 206 between inlet port 284 and outlet port 292. Expansion port 290 may include a diverging section having a diameter that may expand from inlet port 284 to a constant diameter. The diverging section may allow compressed gas 502 to expand gradually. In one example, a throat section may be added between inlet port 284 and expansion port 290 and a flame retardant port may be connected to inlet port 284 to inject flame retardant into valve body 206 that may mix with a flow of compressed gas 502 in the throat section. The pressure contained within gas cartridge 500 then may disburse the flame retardant/compressed gas mix throughout freight dunnage bag 100.

Outlet port 292 may be an opening in valve body 206 between expansion port 290 and valve body bottom 262. Outlet port 292 may have a diameter similar to a diameter of expansion port 290. Further, outlet port 292 may channel compressed gas 502 into freight dunnage bag interior 106.

Disc 294 may be a flat, rounded plate positioned in expansion port 290 whose movement may partly or fully block flow of compressed gas 502 through valve body 206. When positioned perpendicular to adaptor centerline 216, disc 294 may fully block flow of compressed gas 502 through valve body 206. Disc 294 may have other shapes, such as a ball shape, plug shape.

Stem 296 may be a rod connected to disc 294 within outlet port 292. Stem 296 may be rotatably connected to valve body 206 and may transmit motion to control disc 294 from outside of valve body 206. Stem 296 may be offset from adaptor centerline 216 to divide disc 294 into a disc large area 312 and a disc small area 314. Disc large area 312 may be positioned on one side of stem 296 and disc small area 314 may be positioned on the opposite side of stem 296. Disc large area 312 may be greater than disc small area 314 so that pressure from gas cartridge 500 may exert more force on disc large area 312 than exerted on disc smaller area 314. This may bias disc 294 to rotate one direction (such as counterclockwise in FIG. 3). The amount of tug force needed to be imparted into an activating cord 316 may be a function of the offset of stem 296 from adaptor centerline 216.

Upper seat 298 and lower seat 302 may be stationary surfaces in valve body 206 that may contact disc 294 to form a seal that may be leak-tight when discharge valve 310 is shut. Upper seat 298 may be positioned adjacent to disc smaller area 314 and lower seat 302 may be positioned adjacent to disc larger area 312. In this arrangement, pressure from gas cartridge 500 may bias discharge valve 310 closed. Upper seat 298 and lower seat 302 may include metal, but preferably may include a softer material, such as plastic, elastomer, synthetic rubber, thermoplastic, polytetrafluoroethylene, ethylene propylene diene monomer, nitrile rubber, and fluoroelastomers, to better ensure a one hundred percent tight shutoff when discharge valve 310 is closed.

Spring 304 may be an elastic device that may return to its shape or position when pushed, pulled, or pressed. Spring 304 may be configured to bias disc 294 to be seated against upper seat 298 and lower seat 302 when pressure within expansion port 290 substantially equals pressure in outlet port 292. In one example, spring 304 may be a flexible elastic object that may store mechanical energy when spring 304 is twisted. Status tube channel 306 and actuating cord channel 308 each may be open passageways through valve body 206 between valve body bottom 262 and expansion port 290.

Freight dunnage bag 100 further may include a cord tube 315, actuating cord 316 having a handle 318 (FIG. 2) having a handle hole 319 (FIG. 5) and include a status tube 320, a bulb tube 322, and a status bulb 324 having a status bulb top 326 and a status bulb height 328 as measured from cap bottom 212 to status bulb top 326. Cord tube 315 may be attached to capsule 204 and actuating cord 316 may be attached to disc large area 312 of disc 294 at one end and to handle 318 at another end. Status tube 320 may be attached to status tube channel 306 at one end and to bulb tube 322 at another end. Status bulb 324 may be attached to bulb tube 322.

Cord tube 315 may be an open, flexible passageway from valve body well 258 through capsule base 234 and sealant 250 to capsule interior gap 252. Cord tube 315 may be offset from adaptor centerline 216. Cord tube 315 may align with actuating cord channel 308 when valve body bottom 262 faces capsule base 234.

Actuating cord 316 may be a string, twine, wire bundle, cable, or other type of line to transfer pull force from handle 318 to disc 294. Handle 318 may be an object that may be configured to be held to use or move actuating cord 316. Actuating cord 316 may be passed through handle hole 319 and handle 318 may be attached to actuating cord 316 outside of freight dunnage bag 100.

Actuating cord 316 may be passed from outside freight dunnage bag 100 through bulb well 220, cap cord hole 230, capsule interior gap 252, capsule cord hole 238, valve body well 258, actuating cord channel 308, and expansion port 290 to disc large area 312. Actuating cord 316 may be slacked within capsule interior gap 252 and/or valve body well 258 to account for rotation of valve body 206 relative to capsule 204. Pulling on handle 318 may cause disc 294 to rotate away from upper seat 298 and lower seat 302 to open passage from expansion port 290 to outlet port 292. In one example, cord tube 315 may extend to and connect with actuating cord channel 308. This may provide actuating cord 316 a protective sleeve for that portion of actuating cord 316 passing through valve body well 258.

Status tube 320 may be an open, flexible passageway from status tube channel 306 through valve body well 258, capsule tube hole 236, and sealant 250 to capsule interior gap 252. Status tube 320 may be aligned with adaptor centerline 216 at capsule interior gap 252. Status tube 320 may be slacked within valve body well 258 to account for rotation of valve body 206 relative to capsule 204.

Bulb tube 322 may be an open, rigid passageway connected between status bulb 324 and status tube 320. In assembly, as cap 202 is screwed into capsule 204, bulb tube 322 extends through capsule interior gap 252 to meet and be joined with status tube 320. Bulb tube 322 may be positioned along adaptor centerline 216 so that its positional relationship to status tube 320 does not change as cap 202 is rotated. Adaptor 200 may include a mechanism such as o-rings, screw threads, ball and detents, and the like to ensure that the seal between bulb tube 322 and status tube 320 may be a pressure seal. In another example, status tube 320 may deliver pressure to capsule interior gap 252 and bulb tube 322 may tap pressure from within capsule interior gap 252 without being in contact with status tube 320. Here, cord tube 315 may extend to and connect with cap cord hole 230 to prevent pressure from leaving capsule interior gap 252 through cap cord hole 230.

Status bulb 324 may be an inflatable rubber bag residing within bulb well 220 and connected to bulb tube 322. Status bulb 324 may provide a visual cue on the exterior of freight dunnage bag 100 as to the pressure state within freight dunnage bag 100. When pressure within expansion port 290 is greater than the pressure outside of freight dunnage bag 100, status bulb 324 may be inflated. If freight dunnage bag 100 is not inflated and status bulb 324 is inflated, then there may be sufficient charge within gas cartridge 500 to inflate freight dunnage bag 100. If status bulb 324 is deflated, then there may not be sufficient charge within gas cartridge 500 to inflate freight dunnage bag 100.

As noted above, status bulb 324 may reside at status bulb height 328 from cap bottom 212. In one example, status bulb height 328 may be less than bulb well height 224 so that status bulb top 326 may reside within bulb well 220. Here, cap 202 may be used to protect status bulb 324 from other objects.

Figure 4:
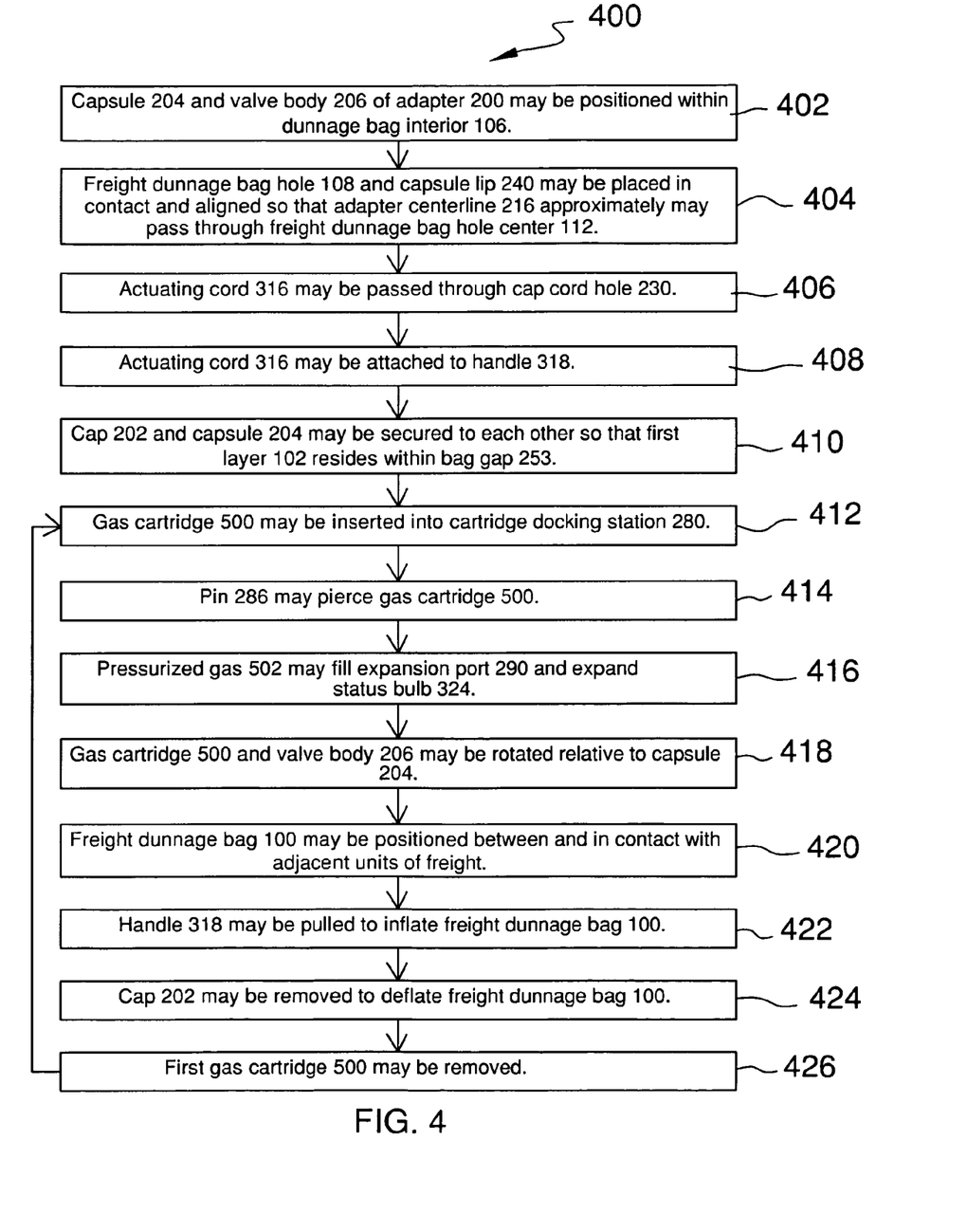
FIG. 4 is a method 400 to assemble freight dunnage bag 100 and install freight dunnage bag 100 between and in contact with adjacent units of freight.

FIG. 4 is a method 400 to assemble freight dunnage bag 100 and install freight dunnage bag 100 between and in contact with adjacent units of freight. FIG. 5 is an exploded isometric view of freight dunnage bag 100. At 402, capsule 204 and valve body 206 of adaptor 200 may be positioned within dunnage bag interior 106. At 404, freight dunnage bag hole 108 and capsule lip 240 may be placed in contact and aligned so that adaptor centerline 216 approximately may pass through freight dunnage bag hole center 112. At 406, actuating cord 316 may be passed through cap cord hole 230. At 408, actuating cord 316 may be attached to handle 318.

At 410, cap 202 and capsule 204 may be secured to each other so that first layer 102 may reside within bag gap 253 (FIG. 3). This may provide a pressure seal between first layer 102 and adaptor 200. At 412, gas cartridge 500 may be inserted into cartridge docking station 280. At 414, pin 286 may pierce gas cartridge 500. At 416, pressurized gas 502 may fill expansion port 290 and expand status bulb 324.

At 418, gas cartridge 500 and valve body 206 may be rotated relative to capsule 204. For example, gas cartridge 500 and valve body 206 may be rotated at least ninety degrees relative to capsule 204 to reduce the lengthwise footprint of the actuator 200 and gas cartridge 500 assembly. First layer 102 and second layer 104 may be sealed to each other.

Figure 6:
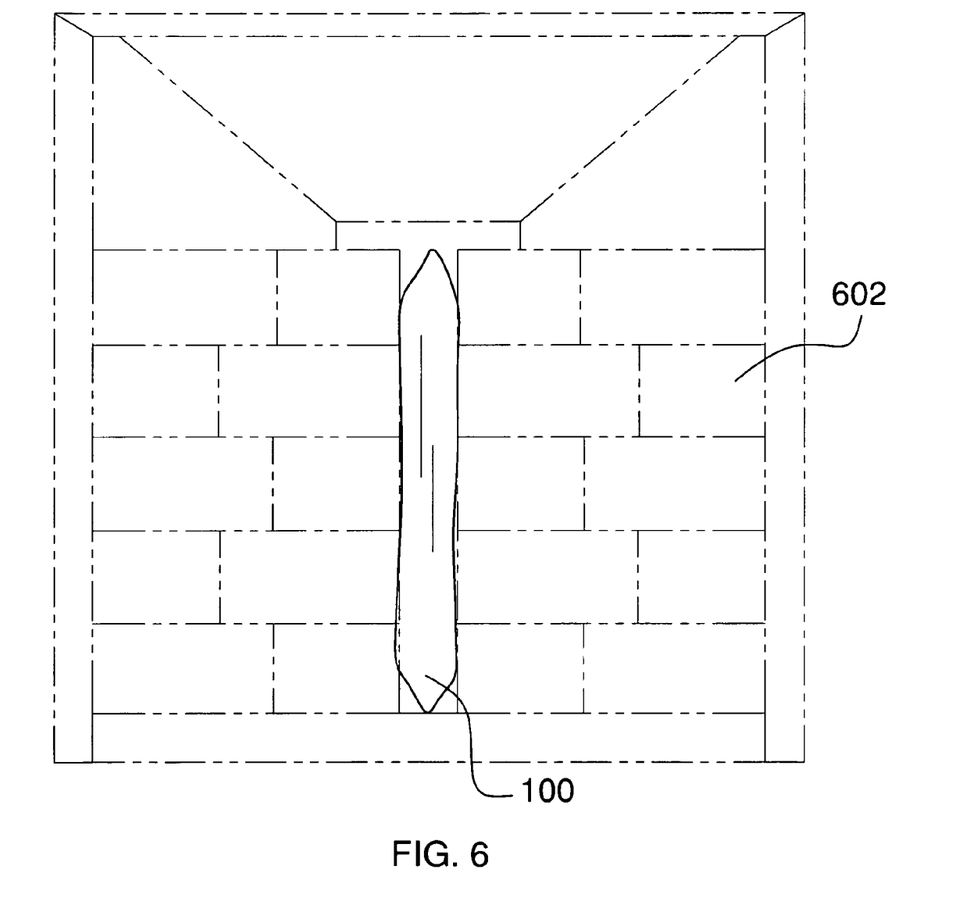
FIG. 6 is a side view of freight dunnage bag 100 installed between and in contact with adjacent units of freight 602.

At 420, freight dunnage bag 100 may be positioned between and in contact with adjacent units of freight. At 422, handle 318 may be pulled to inflate freight dunnage bag 100. FIG. 6 is a side view of freight dunnage bag 100 installed between and in contact with adjacent units of freight 602. At 424, cap 202 may be removed to deflate freight dunnage bag 100. At 426, first gas cartridge 500 may be removed. Method 400 then may return to step 412.

The freight dunnage bag may include an air-expanded polyethylene bladder having a device to inflate the freight dunnage bag automatically without the use of an external air compressor device. The freight dunnage bag may accommodate discrete units of freight that have been loaded on board a freight carrier for transportation, the freight accommodation being to assure the integrity of the load unit against the hazards of dynamic forces incident to transit. The freight dunnage bag may be positioned between load units of angular configuration to define a part or spaced parts of complementing angular configuration whereby contactively to extend about both sides of the edge defining the angular configuration. As freestanding members unconnected to the freight carrier, the freight dunnage bag may be freely inserted between and in contact with adjacent load units to accommodate the freight by filling in the spaces between the load units. When installed, the freight dunnage bag may brace loads, absorb vibrations, and otherwise may protect the cargo from falling forward or backwards.

The freight dunnage bag may be inflated with an internal carbon dioxide canister or some other type of compressed gas instead of an external compressed air source. This may save time and effort for a truck driver when securing and stabilizing freight about to be transported within a large commercial truck or trailer. It may also help ensure that the load is restrained safely to avoid possible damage during shipping.

The freight dunnage bag may fill voids, brace loads, absorb vibrations, and protect cargo from falling. It may be rectangular with rounded corners and configured in different sizes to accommodate different load restraint requirements. The freight dunnage bag may include a high-quality poly-woven bag with polyethylene liner having an automatic capsule, string, tag, status indicator, and carbon dioxide canister. In one example, these elements may be installed in place of a typical air pressure inlet.

To restrain a load inside a truck trailer, the driver may place a deflated freight dunnage bag into a space to be filled. By pulling the string, the carbon dioxide canister may be opened to fill the bag automatically with a predetermined amount of gas. This may remove the guesswork from filling a freight dunnage bag through an external air compressor device and avoid tearing or ripping the freight dunnage bag. The freight dunnage bag may fill the space between the cargo and other surfaces to prevent any shifting or falling of freight while in transit.

The freight dunnage bag may be reusable with a new carbon dioxide canister added with each use. The string and pull tab may be replaced as needed. While suited for the trucking industry, the freight dunnage bag also may be used when transporting loads in trains, boats, and ships. The freight dunnage bag seals may be non-leaking seal that may endure more than ten tons of pressure. The freight dunnage bag may be deflated fast and easily with the mere rotation of the cap.

The freight dunnage bag may fulfill a need for securing freight within commercial vehicles quickly. Appealing features of the freight dunnage bag may be its convenience and load protection. Instead of spending considerable time and effort adding air to a freight dunnage bag at the dock with an air compressor, air tool, and gauge, the freight dunnage bag with carbon dioxide canister may be employed merely by the pull of a cord. This may simplify the operation with less time spent at the dock so important freight may be delivered in a timely manner.

The freight dunnage bag effectively may fill a void or open space so the load was resistant to shifting, vibration, or toppling over while traveling. This may prevent costly damage, time-consuming cleanup, and higher insurance costs for trucking firms. The inflatable freight dunnage bag may provide peace of mind for concerned truck drivers just knowing a temporary barrier was being provided where freight might normally be prone to shifting.

The information disclosed herein is provided merely to illustrate principles and should not be construed as limiting the scope of the subject matter of the terms of the claims. The written specification and figures are, accordingly, to be regarded in an illustrative rather than a restrictive sense. Moreover, the principles disclosed may be applied to achieve the advantages described herein and to achieve other advantages or to satisfy other objectives, as well.

What is claimed is:

1. A freight dunnage bag to accommodate discrete units of freight that have been loaded on board a freight carrier for transportation, the freight dunnage bag comprising:
    a first layer dividing a freight dunnage bag interior from a freight dunnage bag exterior;
    an adaptor having a capsule attached between a cap and a valve body, where the first layer resides between the capsule and the cap; and
    a gas cartridge attached to the adaptor within the freight dunnage bag interior, where the gas cartridge includes compressed gas.

2. The freight dunnage bag of claim 1, where the capsule includes a capsule base positioned within a capsule sidewall and having a capsule tube hole and a capsule cord hole, where the capsule further includes a capsule lip attached to a first end of the capsule sidewall and a capsule left stanchion and a capsule right stanchion attached to an opposite end of the capsule sidewall to oppose each other.

3. The freight dunnage bag of claim 2, where the capsule sidewall and the capsule base enclose a capsule interior, where the capsule further includes sealant positioned adjacent to the capsule base and within the capsule interior to define a capsule interior gap.

4. The freight dunnage bag of claim 2, were the capsule left stanchion and the capsule right stanchion are separated by a rear stanchion opening and a front stanchion opening, where the capsule left stanchion, the capsule right stanchion, and the capsule base define a valve body well, where the valve body and the capsule are connected so that part of the valve body resides within the valve body well.

5. The freight dunnage bag of claim 1, where the adaptor includes an adaptor center line, where the cap includes a cap sidewall connected between a cap lip and a cap bottom, where the cap lip include a cap lip outside perimeter concentric with a cap lip inside perimeter about the adaptor centerline, where the cap bottom includes cap bottom external threads, a cap tube hole, and a cap cord hole.

6. The freight dunnage bag of claim 5, where the cap lip inside perimeter and cap bottom form a bulb well, where the bulb well is a hollow area having a cap rib to assist in rotating the cap.

7. The freight dunnage bag of claim 5, where the cap tube hole is an opening through cap bottom having a center aligned with the adaptor centerline, where the cap cord hole is an opening through cap bottom having a center offset from the adaptor centerline.

8. The freight dunnage bag of claim 1, where the valve body further includes a cartridge docking station, an inlet port, an expansion port, and an outlet port, where each is centered on the adaptor centerline and connected to form an open passageway from a valve body top through valve body to a valve body bottom.

9. The freight dunnage bag of claim 8, where the valve body further includes a pin connected to the inlet port by a pin mount, a disc rotatably connected to the outlet port by a stem, an upper seat connected to the expansion port and a lower seat connected to the outlet port, a spring configured to bias the disc against and between the upper seat and the lower seat.

10. The freight dunnage bag of claim 9, where the valve body further includes a status tube channel and an actuating cord channel that pass from valve body bottom through the valve body to the expansion port, where the inlet port includes a converging section and the expansion port includes a diverging section.

11. The freight dunnage bag of claim 9, where the stem is offset from the adaptor centerline to divide the disc into a disc large area and a disc small area, where the upper seat is positioned adjacent to the disc smaller area and the lower seat is positioned adjacent to the disc larger area.

12. The freight dunnage bag of claim 11, where the cap lip inside perimeter and cap bottom form a bulb well, the freight dunnage bag further comprising:
    a cord tube attached to the capsule;
    an actuating cord attached to the disc large area at one end and to a handle at another end, where the actuating cord passes through the cord tube;
    a status tube attached to a status tube channel at one end and to a bulb tube at another end; and
    a status bulb attached to the bulb tube within the bulb well.

13. In a freight dunnage bag to accommodate discrete units of freight that have been loaded on board a freight carrier for transportation, an inflation device comprising:
    an adaptor having a capsule attached between a cap and a valve body, where the valve body is configured to rotate relative to the capsule, where the capsule includes a capsule interior that is sealed against releasing pressure by the cap, where the capsule interior is connected to the valve body to reflect pressure within the valve body, and where the cap includes a status bulb that reflects pressure within the capsule interior; and
    a gas cartridge attached to the adaptor within a freight dunnage bag interior, where the gas cartridge includes compressed gas.

14. The freight dunnage bag of claim 13, further comprising:
    a cord tube attached to the capsule;
    an actuating cord attached to the disc at one end and to a handle at another end, where the actuating cord passes through the cord tube; and
    a status tube attached to a status tube channel at one end and to a bulb tube at another end, where the status bulb is attached to the bulb tube.

15. A method to inflate a freight dunnage bag to accommodate discrete units of freight that have been loaded on board a freight carrier for transportation, the method comprising:
    positioning a capsule and a valve body of an adaptor within a freight dunnage bag interior of the freight dunnage bag, where the valve body includes a disc and an actuating cord attached to the disc;
    passing the actuating cord through a cap cord hole of a cap of the adaptor;
    securing the cap to the capsule so that a first layer of the freight dunnage bag resides between the cap and the capsule; and
    inserting a gas cartridge into the valve body, where the gas cartridge includes compressed gas, where the valve body is configured to release the compressed gas into the freight dunnage bag interior when the actuating cord is pulled.

16. The method of claim 15, further comprising:
    piercing the gas cartridge with a pin to fill an expansion port of the valve body with compressed gas, where the disc is configured to retain the compressed gas in the expansion port in a first position and configured to release the compressed gas into the freight dunnage bag interior when the actuating cord is pulled.

17. The method of claim 15, where the gas cartridge is a first gas cartridge, the method further comprising:
   removing the first gas cartridge from the valve body; and
   inserting a second gas cartridge into the valve body, where the second gas cartridge includes compressed gas.

* * * * *